US 10,857,491 B2

(12) United States Patent
Braschi et al.

(10) Patent No.: US 10,857,491 B2
(45) Date of Patent: Dec. 8, 2020

(54) FILTERING PANEL AND METHOD OF MAKING THE SAME

(71) Applicant: Evoqua Water Technologies, LLC, Warrendale, PA (US)

(72) Inventors: Marco Braschi, Pavia (IT); Roberto Negrini, Bressana Bottarone (IT)

(73) Assignee: Evoqua Water Technologies LLC, Pittsburgh, PA (US)

(*) Notice: Subject to any disclaimer, the term of this patent is extended or adjusted under 35 U.S.C. 154(b) by 119 days.

(21) Appl. No.: 15/316,379

(22) PCT Filed: Jun. 5, 2015

(86) PCT No.: PCT/EP2015/062601
§ 371 (c)(1),
(2) Date: Dec. 6, 2016

(87) PCT Pub. No.: WO2015/185736
PCT Pub. Date: Dec. 10, 2015

(65) Prior Publication Data
US 2018/0147509 A1 May 31, 2018

(30) Foreign Application Priority Data
Jun. 5, 2014 (IT) .............................. MI2014A1030

(51) Int. Cl.
*B01D 33/23* (2006.01)
*B01D 29/07* (2006.01)
(Continued)

(52) U.S. Cl.
CPC ........... *B01D 33/23* (2013.01); *B01D 29/012* (2013.01); *B01D 29/07* (2013.01); *B01D 29/413* (2013.01);
(Continued)

(58) Field of Classification Search
CPC ............ B01D 33/0006; B01D 33/0041; B01D 33/0045; B01D 33/0048; B01D 33/0051;
(Continued)

(56) References Cited

U.S. PATENT DOCUMENTS

| 1,685,118 A | 9/1928 | Campbell |
| 1,712,258 A | 5/1929 | Compain |

(Continued)

FOREIGN PATENT DOCUMENTS

| AL | 0076620 A1 | 12/2000 |
| CA | 2023302 A1 | 2/1991 |

(Continued)

OTHER PUBLICATIONS

Algas Fluid Technology Systems AS, Environmental Protection Made Profitable, Feb. 3, 2004, 4 pages, Moss Norway.
(Continued)

*Primary Examiner* — David C Mellon

(57) ABSTRACT

The present invention relates to a filtering panel (100) for a disk filter and a disk filter for water purification, comprising a metal filter cloth (16, 116) such as a stainless steel filter cloth, pre-tensioned in both warp and weft directions and fastened to a frame (10, 110) comprising a peripheral portion (11, 111), which is integral with an inner grillwork (12) and which divides the inner area of the peripheral portion (11, 111) into fields (15, 115). The frame (10, 110) comprises a plastic material reinforced with glass fibers or carbon fibres such as polypropylene loaded with fibreglass in an amount of at least 20 weight percent. Each field of the grillwork (12, 112) has an area not exceeding 10% of the inner area of the peripheral portion (11, 111). The pre-tensioning of the filter cloth (16, 116) in both directions is from at least 20% of the yield stress of the cloth (16, 116). Further the present invention relates to a disk filter comprising said filtering
(Continued)

panels (100) and method of making said filtering panel (100).

20 Claims, 10 Drawing Sheets

(51) Int. Cl.
    *B01D 29/41* (2006.01)
    *B01D 33/21* (2006.01)
    *B01D 29/01* (2006.01)
    *B01D 33/067* (2006.01)
    *B01D 33/11* (2006.01)
    *B01D 33/50* (2006.01)
    *B07B 1/46* (2006.01)

(52) U.S. Cl.
    CPC ............ *B01D 33/067* (2013.01); *B01D 33/11* (2013.01); *B01D 33/21* (2013.01); *B01D 33/50* (2013.01); *B01D 2201/127* (2013.01); *B07B 1/4618* (2013.01)

(58) Field of Classification Search
    CPC ............ B01D 33/0093; B01D 33/015; B01D 33/0158; B01D 33/0183; B01D 33/067; B01D 33/11; B01D 33/15; B01D 33/21; B01D 33/215; B01D 33/23; B01D 33/25; B01D 33/50; B01D 29/012; B01D 29/413; B01D 29/07; B01D 2201/127; B07B 1/4618
    See application file for complete search history.

(56) References Cited

U.S. PATENT DOCUMENTS

| | | | |
|---|---|---|---|
| 1,804,934 A | 5/1931 | Hoyt et al. |
| 1,826,485 A | 10/1931 | Thorne |
| 1,833,315 A | 11/1931 | Burhans |
| 2,022,069 A | 11/1935 | Bryan |
| 2,076,104 A | 4/1937 | Vinton |
| 2,464,223 A | 3/1949 | Genter |
| 2,964,194 A | 12/1960 | Oliver et al. |
| 3,163,601 A | 12/1964 | Erickson et al. |
| 3,193,105 A | 7/1965 | Putnam et al. |
| 3,221,887 A | 12/1965 | Schade |
| 3,331,512 A | 7/1967 | Vore |
| 3,363,770 A | 1/1968 | Glos, II |
| 3,369,688 A | 2/1968 | Glos, II |
| 3,438,505 A | 4/1969 | Luthi |
| 3,471,026 A | 10/1969 | Riker et al. |
| 3,485,376 A | 12/1969 | Peterson et al. |
| 3,610,419 A | 10/1971 | Vallee et al. |
| 3,643,803 A | 2/1972 | Glos, II |
| 3,692,181 A | 9/1972 | Davis |
| 3,948,779 A | 4/1976 | Jackson |
| 4,090,965 A | 5/1978 | Fuchs |
| 4,139,472 A | 2/1979 | Simonson |
| 4,162,982 A | 7/1979 | Chesner |
| 4,256,580 A | 3/1981 | Rimmele |
| 4,268,385 A | 5/1981 | Yoshikawa |
| 4,330,405 A | 5/1982 | Davis et al. |
| 4,346,008 A | 8/1982 | Leighton et al. |
| 4,563,282 A | 1/1986 | Wittmann et al. |
| 4,617,122 A | 10/1986 | Kruse et al. |
| 4,639,315 A | 1/1987 | Fuchs et al. |
| 4,655,920 A | 4/1987 | Ragnegard |
| 4,710,294 A | 12/1987 | Ziller |
| 4,781,835 A | 11/1988 | Bahr et al. |
| 4,814,093 A | 3/1989 | Frykhult |
| 4,838,910 A | 6/1989 | Stollenwerk et al. |
| 4,865,732 A | 9/1989 | Garrant et al. |
| 4,950,403 A | 8/1990 | Hauff et al. |
| 5,037,562 A | 8/1991 | Tarves, Jr. |
| 5,076,924 A | 12/1991 | Persson et al. |
| 5,084,174 A | 1/1992 | Perala et al. |
| 5,087,358 A | 2/1992 | Massignani |
| 5,227,065 A | 7/1993 | Strid |
| 5,242,590 A | 9/1993 | Thomson et al. |
| 5,296,143 A | 3/1994 | Frykhult |
| 5,304,304 A | 4/1994 | Jakobson et al. |
| 5,330,645 A | 7/1994 | Geldmacher |
| 5,330,646 A | 7/1994 | Frykhult |
| 5,599,446 A * | 2/1997 | Junker ................ B01D 25/001 210/230 |
| 5,635,062 A | 6/1997 | Cameron et al. |
| 5,647,982 A | 7/1997 | Haythornthwaite et al. |
| 5,667,680 A | 9/1997 | Haeffner |
| 5,685,983 A | 11/1997 | Frykhult |
| 5,759,397 A | 6/1998 | Larsson et al. |
| 5,766,466 A | 6/1998 | Peterson |
| 5,792,352 A | 8/1998 | Scheucher et al. |
| 5,804,071 A | 9/1998 | Haeffner |
| 5,820,756 A | 10/1998 | McEwen et al. |
| 5,876,612 A | 3/1999 | Astrom |
| 5,893,972 A | 4/1999 | Peterson |
| 5,928,396 A | 7/1999 | Choi |
| 6,006,554 A | 12/1999 | Gallagher |
| 6,113,783 A | 9/2000 | Strid et al. |
| 6,231,761 B1 | 5/2001 | Mohlin et al. |
| 6,231,764 B1 | 5/2001 | Wilkins |
| 6,447,617 B1 | 9/2002 | Bergmann |
| 6,461,507 B1 | 10/2002 | Ishigaki et al. |
| D497,660 S | 10/2004 | Danielsson et al. |
| 7,255,723 B2 | 8/2007 | Choi et al. |
| 7,293,659 B2 | 11/2007 | Grace |
| 7,314,556 B2 | 1/2008 | Sheets et al. |
| 7,597,805 B2 | 10/2009 | Danielsson et al. |
| 8,118,175 B2 | 2/2012 | Davis et al. |
| 8,343,248 B2 | 1/2013 | Suzuki et al. |
| 8,597,391 B1 | 12/2013 | Dietz |
| 2002/0050283 A1 | 5/2002 | Bergmann |
| 2002/0195388 A1 | 12/2002 | Sierens et al. |
| 2004/0232076 A1 | 11/2004 | Zha et al. |
| 2005/0082217 A1 | 4/2005 | Hagg et al. |
| 2005/0121381 A1 | 6/2005 | Sheets et al. |
| 2008/0035584 A1* | 2/2008 | Petit ...................... B01D 29/012 210/780 |
| 2008/0245707 A1* | 10/2008 | Smith .................. B07B 1/4618 209/412 |
| 2010/0012572 A1* | 1/2010 | Verschaeve .......... B01D 29/012 210/347 |
| 2011/0024347 A1 | 2/2011 | Larsson et al. |
| 2011/0056883 A1* | 3/2011 | Kerl ....................... B01D 29/03 210/483 |
| 2012/0325753 A1 | 12/2012 | Baker et al. |
| 2013/0153486 A1 | 6/2013 | Danielsson et al. |
| 2013/0228506 A1* | 9/2013 | Ralvert ................ B01D 33/23 210/331 |
| 2014/0123494 A1 | 5/2014 | Bailey |
| 2015/0008194 A1 | 1/2015 | Davis et al. |

FOREIGN PATENT DOCUMENTS

| | | |
|---|---|---|
| CA | 2070341 A1 | 12/1992 |
| CA | 2149090 A1 | 11/1996 |
| CN | 1281378 A | 1/2001 |
| CN | 1557525 A | 12/2004 |
| CN | 1742133 A | 3/2006 |
| CN | 1753716 A | 3/2006 |
| DE | 9319221 U1 | 2/1994 |
| EP | 0247445 A1 | 12/1987 |
| EP | 1090665 A2 | 4/2001 |
| EP | 1205265 A2 | 5/2002 |
| EP | 1596958 A1 | 11/2005 |
| EP | 1961475 A1 | 8/2008 |
| FR | 2595957 A1 | 9/1987 |
| GB | 861751 A | 2/1961 |
| GB | 957991 A | 5/1964 |
| JP | 2002126800 A | 5/2002 |
| JP | 2008119608 A | 5/2008 |
| SE | 224131 C1 | 1/1969 |

(56) References Cited

FOREIGN PATENT DOCUMENTS

| | | | |
|---|---|---|---|
| SE | 526692 | C2 | 10/2005 |
| WO | 9112067 | A1 | 8/1991 |
| WO | 9419088 | A1 | 9/1994 |
| WO | 9735656 | A1 | 10/1997 |
| WO | 9811972 | A1 | 3/1998 |
| WO | 9930797 | A1 | 6/1999 |
| WO | 2000037159 | A1 | 6/2000 |
| WO | 02085487 | A1 | 10/2002 |
| WO | 03039712 | A1 | 5/2003 |
| WO | 03051487 | A1 | 6/2003 |
| WO | 2004076026 | A1 | 9/2004 |
| WO | 2008002240 | A1 | 1/2008 |
| WO | 2008021270 | A2 | 2/2008 |
| WO | 2009011864 | A1 | 1/2009 |
| WO | 2012030285 | A1 | 3/2012 |

OTHER PUBLICATIONS

Algas, Algas Thickener, Feb. 3, 2004, 4 pages, Moss, Norway.
Algas, More than NOK 2 Million Measures, Feb. 3, 2004, 1 page.
Algas, Raw Water Treatment, Feb. 3, 2004, 1 page.
Envirex, Rex Microscreens, Bulletin—Product Features and Benefits, 1989, 12 pages, Waukesha, Wisconsin USA.
Envirex, Rex Microscreens, Bulliten No. 315-31, 1989, 8 pages, Waukesha, Wisconsin, USA.
Envirex, Rex Rotary Drum Vacuum Filters, at least as early as Aug. 1, 2005, 6 pages, Waukesha, Wisconsin USA.
GL&V Dorr-Oliver, The American Disc Filter, Bulliten 7202, 2000, 7 pages.
Hans Huber AG, Huber Technology, Rotafilt Cloth Filtration Plant, Aug. 1997, 5 pages, Germany.
Material re: 1999 Hydrotech Installation at Anniston, AL Wastewater Treatment Plant.
Material re: 2002 Hydrotech Installation (Filtertype HSF2110-2F; Serial No. 2931) at Casale Wastewater Treatment Plant.
Material re: 2002 Hydrotech Installation (Filtertype HSF3112-2F; Serial Nos. 3013 et seq.) at Pero Wastewater Treatment Plant.
Material re: Hydrotech Disc Filter (Filtertype HSF1702-1H; Serial No. 2351; 2000).
Material re: Hydrotech Disc Filter (Filtertype HSF2108-1F; Serial No. 2455; 2001).
Nordic Water Products AB, Efficient Filtration with DynaDisc Filter, at least as early as Aug. 1, 2005, 8 pages, Sweden.
Skowronski, Maik, "Communication pursuant to Article 94(3) EPC", European Patent Application No. 15 729 383.8, dated Dec. 11, 2019, 4 pages.

\* cited by examiner

FILTERING PANEL AND METHOD OF MAKING THE SAME

FIELD OF TECHNOLOGY

The present invention relates to water purification and in particular a filtering panel used in filtration equipment called disk filter and a method of making the same. The filtration in a disk filter is obtained by means of a series of filter disks arranged coaxially and equidistantly.

BACKGROUND

Rotary disk filters comprising a drum having a central longitudinal axis and a plurality of filter disks or disk-shaped filter members being rotatably arranged about the axis are known from, for example, WO 2004/076026 A1 and WO2008/021270, the contents of which are hereby incorporated herein by reference in its entirety. During operation the longitudinal axis carrying the filter disks is rotated. From the interior of the drum a filtering liquid is conducted through openings into the disk filters.

Each filter disk is composed of a series of equal filter panels, substantially trapezoid-shaped and arranged radially. Each filter panel comprises a peripheral frame to which is applied a filter net, in the field called cloth. The filter disks are partially immersed in the water to be filtered. The filtration takes place from the inside out, that is to say the filtering takes place from the inside of the filter member and out through the filter cloth.

The liquid level inside the filter is higher than the liquid level outside the filter disks. Due to the difference in level between the two faces of the filter disk, obtained by compartments or bulkheads, which difference corresponds to a difference in pressure between the two sides of the filter cloth, which generates a hydraulic load on the latter and which causes the water flowing through the cloths to be filtered.

These disk filters are normally used for the final (called tertiary) filtration in municipal sewage treatment plants, or for the filtration of water used in the industry when a fine filtration is required (filter cloth with spacing of 10 to 100 microns).

The conventional cloths used in the disk filters are of polyester and are carried by a frame comprising a peripheral portion, substantially in the shape of a trapezium, all constituting the desired filter panel. Each panel covers a sector of a circular crown of a filter disk of a disk filter). These cloths are made up of thin threads of polyester woven according to a warp and weft which create square openings of the spacing desired. The size of the wires, as reduced, generates a net whose free area takes up between 10 and 15% of the surface of the cloth, with a consequent limitation of the flow of water which is filtered.

The polyester cloths are fixed to the frame, which made made of polypropylene, by heating and pressure, after a modest tension of the cloth in both directions, and subsequent cooling. To measure the tension of a cloth tensiometers are widely used. Tensile measurements or tests are used to determine the tensile strength, yield stress or yield strength and other tensile properties. In the following the tensile properties are expressed as a percentage of the yield stress or denoted as force per unit length of the warp and weft, respectively. For characterizing the tensile properties of filter cloths one important parameter is the yield stress, which is the stress level at which a plastic material, metal or other material ceases to behave elastically and the material begins to deform plastically.

More recently AISI 316 stainless steel cloths have been used with features, in terms of free area or spacing, similar to those of the aforementioned polyester cloths. These cloths, in particular those known as "plain Dutch weave", have a warp and a weft which generate a practically three-dimensional structure which the optimisation of the features of permeability in addition to facilitating the cleaning of the cloth, so they give excellent results. These cloths have warp threads of a greater diameter than weft threads, with fewer warp than weft threads, resulting in a robust and stable cloth. They have, however, an elasticity lower than that of polyester. In particular it has been found that when they are stretched and fixed to the frame and used in a disk filter, in which they are subjected to a perpendicular hydraulic load which is reversed during the periodic phases of so-called backwashing, they are affected by the resulting phenomenon of fatigue, which leads them to premature breakage.

Research carried out has established that the parameters which determine the breakage are:
1—the deflection by which the cloth, fixed to the relative frame, is distorted when subjected to the hydraulic load;
2—the number of cycles of inversion of the hydraulic load.

One solution adopted to try to extend the life of these stainless steel cloths as far as possible is to stretch them, both in the weft and the warp directions, almost to their yield limit (normally between 12 and 17 N/mm), so as to minimise the deflection when they are subjected to hydraulic load, and then fasten them thus stretched to the relative frame. In this way, when the cloth is subjected to the alternate hydraulic load, the deflection with which it is distorted is practically nil and hence not affected by most of the fatigue phenomenon, with the result of significantly lengthening its useful lifetime, so that it achieves an acceptable duration.

This solution, however, requires the use of particularly rigid frames, which are also made of AISI 316 stainless steel, as well employing methods of welding the cloth to the frame (once stretched in both directions almost up to the yield limit) which are rather sophisticated, so as to avoid the fatigue stress in the vicinity of the areas where the cloth is welded to the frame, which are areas of unavoidable weakness in this respect. In said area of weakness there is a tendency to be torn away from the filter frame if the disk filter is in operation.

Another solution which has been adopted and which still uses a stainless steel frame, consists of minimising the deflection of the cloth without tensioning the filter cloth. This is achieved by using a frame of stainless steel constituted, in addition to the peripheral portion, also by a perforated metal sheet inside the frame, which precisely divides the area inside the peripheral portion into windows of a much smaller size, resulting in a drastic reduction of the deflection under hydraulic load. Said windows may be manufactured from stainless steel sheets by pressing through a die with the appropriate hole size pattern and have the disadvantage to reduce the effective filterimg area. In addition to this reduction of the area, before fixing the filter cloth, a large mesh net is fixed to the stainless steel frame.

The sum of the two devices creates a very solid support for the stainless steel filter cloth, minimising the deflection, and so the fatigue stress, thus only having the necessity to stretch the filter cloth to a minimum to hold it in position during the operation of its fixing to the outer portion of the frame.

The solution described above results in a filter panel of a rather complex structure, in addition to involving the need for the frame also to be made of stainless steel, and also requiring a particular welding process of the filter cloth to the peripheral portion of the frame, which makes costs rise considerably. All this, added to the higher cost of the stainless steel filter cloth compared to that of the polyester cloth, defeats the economic advantage of the optimisation of the features of permeability and facility of cleaning which are obtained by using the stainless steel filter cloth.

SUMMARY OF THE INVENTION

The purpose of the present invention is to provide a filtering panel for disk filters, equipped with a metal cloth such as a stainless steel cloth, which does not present the aforementioned disadvantages of the known filtering panels shown exemplarily with stainless steel cloth.

Another object of the present invention is to manufacture filtering panels using metal cloth and avoid the fatigue stress in the vicinity of the areas where the metal cloth is attached to the frame. Further a solution is needed to reduce the distortion effect by deflection occurring typically when hydraulic load is applied on metal cloths such as stainless steel.

It is also desirable that the filter frames of disc filters should be made lighter than stainless steel frames and at the same time stay sufficiently sturdy and robust to enable more tensioning than with filtering panels using conventional polyester filter cloth.

A further object is to provide a filter cloth frame, which has dimensions of the known filter panels with polyester cloth, having the advantage of being introducible and suited for replacement in existing filter frame supports of disk filters for filter panels with polyester cloth.

Another object of the present invention is to provide a filter cloth frame which can be manufactured at relative low costs. Yet another object is to provide to make the manufacturing process as, for instance, fastening the metal cloth to a filter frame easier and less costly. More particularly, when cutting the expensive filter cloths such as woven stainless steel cloths for the filtering panels, there is the drawback that large amount of expensive filter cloth are wasted, when using conventional tensioning techniques. Therefrom derives the purpose to avoid filter cloth waste, when making the filtering panel.

A still further object of the present invention is to provide a tool allowing reliable attachment of a filter cloth to the filter cloth frame and reproducible conditions with regard to tensile properties of the filter cloth.

These purposes are achieved and the relative technical problems are solved by the filtering panel according to claim 1, a filtering disk and the method according to claims as defined by the independent claims. Other features of the filtering panel according to the present invention are specified in the dependent claims and are discussed in further detail below.

One or more aspect of the disclosure is directed to a filtering panel for a disk filter for water purification, the filtering panel comprising a metal filter cloth and a frame comprising a peripheral portion, wherein the frame consists of a plastic material loaded with fibres of glass or carbon, wherein the peripheral portion is integral with an inner grillwork, which divides the inner area of the peripheral portion into fields and each field has an area not exceeding 10% of the inner area of the peripheral portion. Said metal of the filter cloth is selected from the group comprising stainless steel, bronze, copper, brass, titanium, nickel and alloys and the filter cloth is pre-tensioned in both warp and weft directions at least 20% of the yield stress of the cloth and fastened to the frame.

Another aspect of the invention is directed to a filtering panel for a disk filter for water purification, the panel comprising a stainless steel filter cloth, pre-tensioned in both warp and weft directions and fastened to a frame comprising a peripheral portion integral with an inner grillwork which divides the inner area of the peripheral portion into fields, characterised in that:

the frame consists of polypropylene loaded with fibreglass in an amount from 20 to 40 weight percent;

each field has an area not exceeding 10% of the inner area of the peripheral portion;

the pre-tensioning of the filter cloth in both directions ranges from 20 to 30% of the yield stress of the cloth.

However it will be understood that the invention is not limited to a metal filter made of stain less steel. Other metal cloths not being made of stainless steel but of bronze, copper, brass, titanium, nickel and alloys comprising screens can be used. Said metals used as woven filter cloth have an elasticity lower than that of polyester. Hence, they are affected by the phenomenon of fatigue, which can effectively avoided by pre-tensioning and providing a grillwork as described in the disclosure of the invention.

Moreover, it is understood that the embodiments of the invention are not limited by the type of plastic material. Alternatively to above mentioned polypropylene (PP) other thermoplastic materials can be used, which are suited to manufacture components by injection molding and can be reformed or welded by applying heat. The materials of the frame and integral grillwork can be selected from the group comprising polyethylene (PE), polyphenylene oxide (PPO), a blend of PPO and styrene (Noryl), polyphenylene sulfide (PPS) and polyvinyl chloride (PVC) or the like.

One or more aspects of the disclosure provides for a filtering panel or method of upgrading an existing disk filter. Accordingly a filtering panel, wherein the peripheral portion of the frame has the same size as the peripheral portion of a panel with a frame of polypropylene or the like and a polyester filter cloth, may replace the latter in an existing disk filter.

One or more additional aspects of the disclosure provides for a method of making a filtering panel, the method comprising:

injecting plastic material loaded with fibers of glass or carbon into a mold tool to integrally form a frame with a peripheral portion and a grillwork locating the cured frame into a tensioning tool;

placing a metal filter cloth on top of the frame;

fixing the peripheral edge region of the metal filter cloth by the tensioning tool;

pre-tensioning the filter cloth to at least 20% of the yield stress limit of the metal filter cloth; and applying pressure and heat on the pre-tensioned filter cloth to fasten the filter cloth on at least a portion of the peripheral portion by embedding the filter cloth in the plastic material.

The solutions in accordance with the present disclosure provide a filtering panel, disk filter and method for making the filtering panel to significantly increase the lifetime of filtering panels with metal clothing such as for example stainless steel. Another advantage that may be realized in the manufacturing method is that tensioning can be provided while minimizing waste of the filtering cloth. No one advantage is critical to the embodiments.

Other advantages of the present disclosure and the invention will be more readily understood from the following description of exemplary embodiments and drawings. Any disclosed embodiment may be technically combined with any other disclosed embodiment(s).

BRIEF DESCRIPTION OF THE DRAWINGS

The accompanying figures illustrate exemplary embodiments of the disclosure and serve to explain, by way of example the principles of the disclosure and are not intended to be drawn to scale. The figures are included to provide illustration and a further understanding of the various aspects and embodiments, but are not intended to restrict the disclosure to the embodiment illustrated in the figures. Where technical features in the figures or detailed description are followed by references signs, the reference signs have been included for the sole purpose of increasing the intelligibility of the figures and description. For purposes of clarity, not every component may be labeled in every figure.

In this description reference is made to the accompanying drawings, in which.

DETAILED DESCRIPTION OF THE INVENTION

Figure 1:
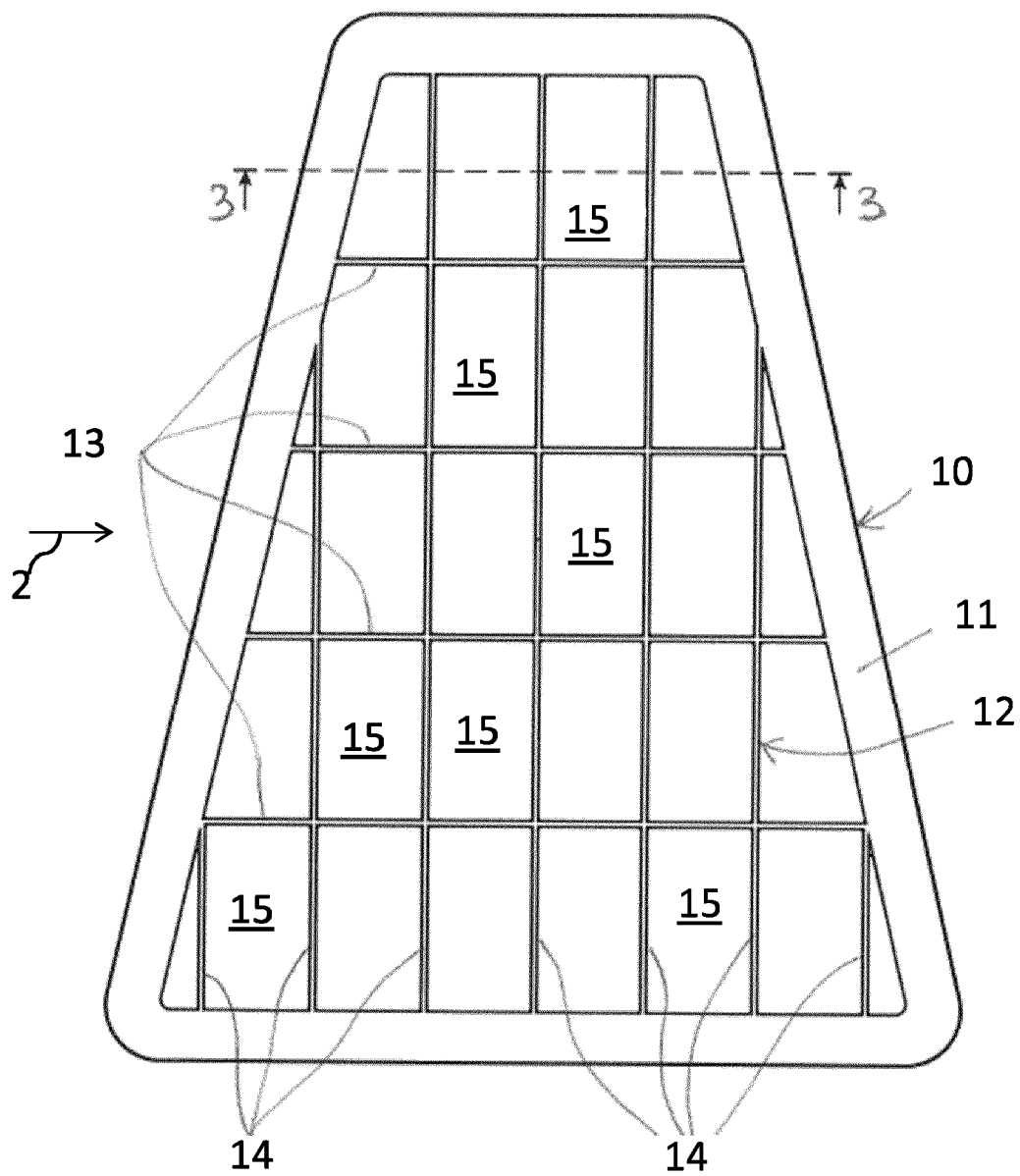
FIG. 1 is a front view of the single frame of a filtering panel according to the present invention.
Figures 2, 3:
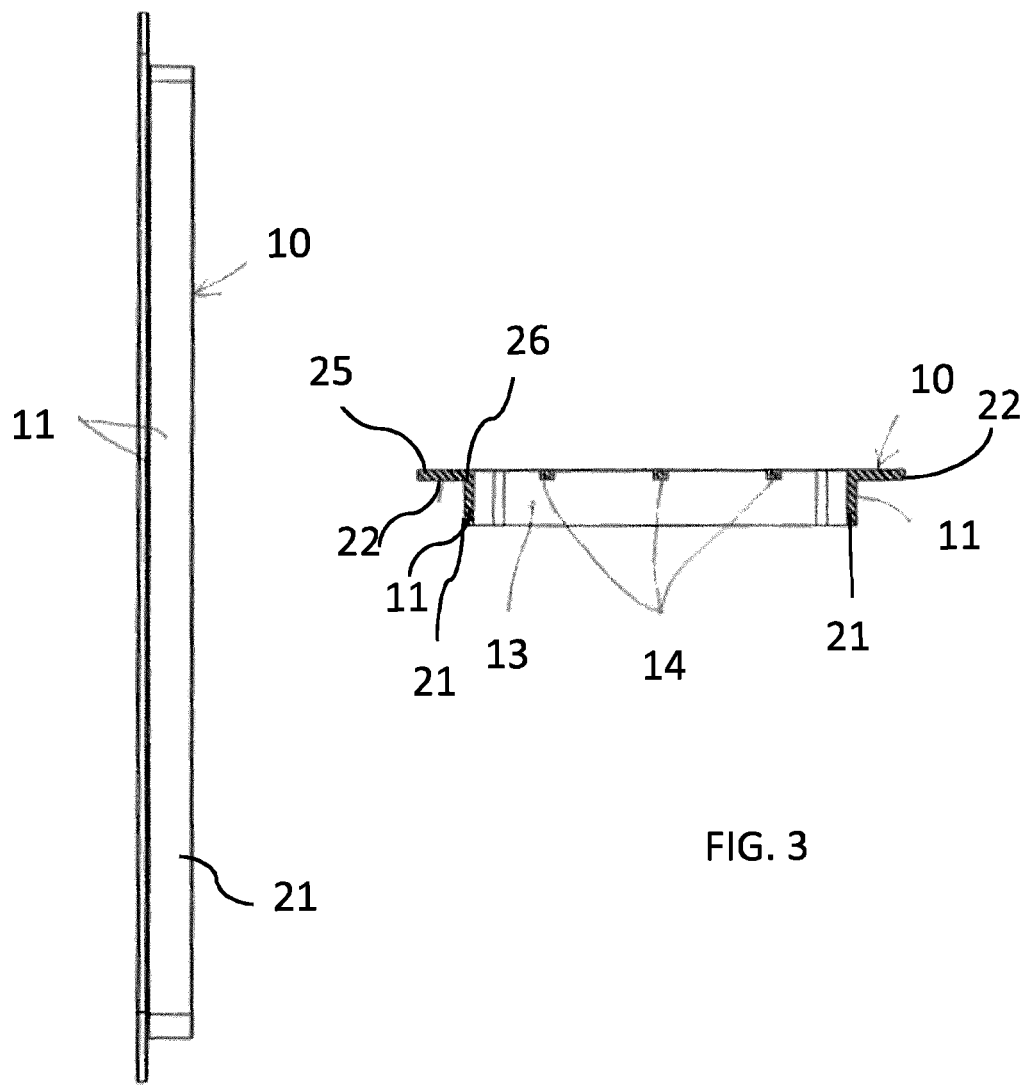
FIG. 2 is a view of the filtering panel according to arrow 2 of FIG. 1.
FIG. 3 is a cross-section according to line 3-3 of FIG. 1.

As can be seen from FIGS. 1-3, frame 10, in the trapezoidal form of the whole, comprises a peripheral frame 11 within which a grillwork is present, indicated as a whole with 12, formed of two series of perpendicularly intersecting strips, respectively 13 and 14, so as to form a multiplicity of fields 15 which, apart from some of the peripheral fields, are rectangular with the largest dimension which is a little less than twice that of the smallest. In this specific case the larger fields have an area which does not exceed 5% of the inner area to the peripheral portion 11. More generally, it is found that in order to be sure not to cause the fatigue phenomena illustrated above, the area of the field must not exceed 10% of the area inside the portion 11.

By using the grillwork constituting of the strips 13 and 14 in combination with the below prescribed pre-tensioning the deflection of the metal filter cloth 16, which is, for instance made of stainless steel, is significantly reduced, when hydraulic load is applied and thus the lifetime of the produced filtering panel can be increased. In this way service requirements for disc filters can be minimised.

The inner perimeter of the peripheral portion 11 of the frame 10 defines the circumference of the so-called filtering area for the inside-out filtration process of the filter panel. It is noted that the dimensions of the strips and corresponding field areas of the rectangulars with the largest dimension range between, for instance, at least 2.5% and maximum 10% of the inner area of the peripheral portion. Constructing the grillwork with said dimensions the effective filtering area is not significantly reduced. Hence, a higher filtration capacity can be maintained, compared to prior art solutions using stainless steel cloths with perforated sheets and meshes in stainless steel frames.

It is further noted that compared to polyester filter cloths metal filter cloths such as stainless steel filter cloths enable higher operating head loss capabilities.

We also note that the transverse strips 13 are considerably more robust than the longitudinal strips 14, whereby the latter download the appropriate load on the first ones. In any case we have a particularly robust frame 10, thanks also to the peripheral portion 11 having an L-shaped cross section. As shown in FIG. 3 the L-shaped cross section comprises a first leg 21, which is in operation located flow parallel, and a second flow-transverse leg 22. Said second leg 22 provides additional stiffness to the first leg 21. The transverse strips 13 have the same height in flow direction as the first leg 21 and provide a robust support for the smaller longitudinal strips 14.

The flow-transverse leg 22 provides an inner edge portion 26 for attaching the filter steel cloth 16 (not shown in FIG. 3) to the frame 10. Further the circumferential outer edge portion 25 of the second leg 22 can be used for providing a further attachment region for the filter cloth 16 as below described in respect to the tensioning tool 300 and compression device 350 illustrated in FIGS. 10-12.

The grillwork 12 forms a single piece with the peripheral portion 10, a piece which is obtained in a conventional manner by mold molding or injection molding of a thermoplastic plastic material such as polypropylene load with about a 30% in weight of glass fibre (for example that of the company Campiresine S.R.L. of Turate, Como). The percentage by weight of glass fibre may in fact vary in a field which goes from 20 to 40%.

The less the percentage of glass fibre the lighter the filter frame can be made, whereas a higher percentage of glass fibre yields a more robust filter frame and accordingly more pre-tensioning can be applied. Other fibre materials can be used such as carbon to reinforce the plastic material. Carbon has the advantage to enable a further reduction in weight. Said fillers or others alike can not only be combined with polypropylene (PP) but also with polyethylene (PE), polyphenylene oxide (PPO), Noryl, polyphenylene sulfide (PPS) and polyvinyl chloride (PVC) and have the object to sufficiently reinforce the plastic frame.

In this way, using for the peripheral portion the same dimensions of the peripheral portion in polypropylene of the known filter panels with polyester cloth, we get a sufficiently sturdy frame which also has the advantage of being replaceable in the filter panels with polyester cloth in existing disk filters.

The need to have a sufficient sturdy and rigid frame is due to the fact that the said stainless steel cloth when it is fixed to the peripheral portion is previously subjected to a tension in both directions of between 20 and 30% of its yield stress, a value which is higher than that to which the conventional polyester filtering cloths applied to the conventional polypropylene frames are subject.

It has been possible to check that the stainless steel filter cloth can be fixed, after the aforementioned pre-tensioning, to the peripheral portion 11 of the frame 10 (for instance of polypropylene reinforced with glass fibre) in a manner similar to that used to fix—precisely by heating and pressure (so that the cloth appears embedded in the polypropylene of the portion 11) and subsequent cooling—the polyester cloth to the polypropylene frame of the conventional filter panels described at the beginning, which evidently constitutes a considerable simplification, with a significant economic advantage.

Figures 4, 5:
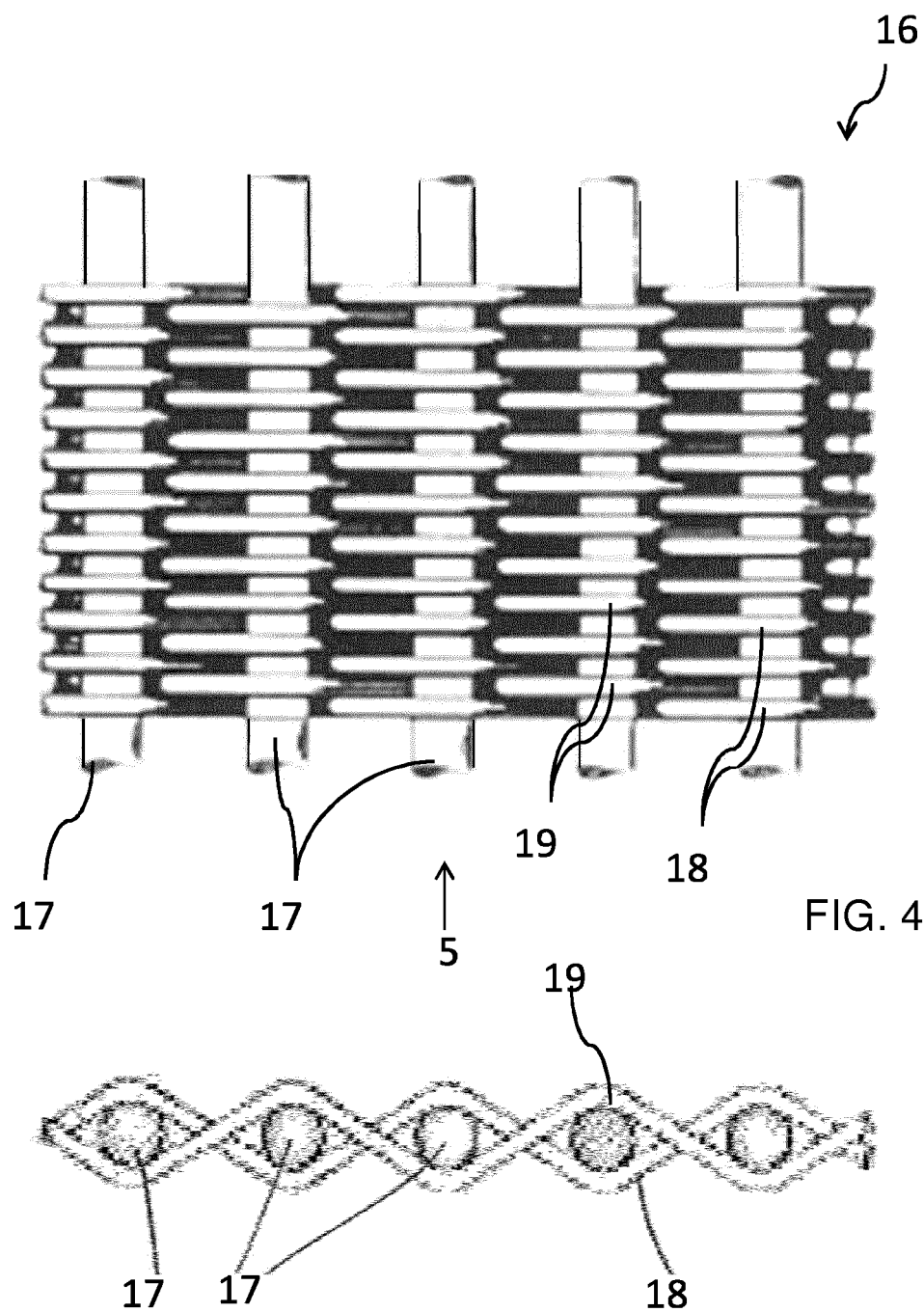
FIG. 4 is a front view, greatly enlarged, of a piece of metal filter cloth, applicable to the frame of FIGS. 1-3 to obtain a filtering panel according to the present invention.
FIG. 5 is a view according to arrow 5 of FIG. 4.
Figure 6:
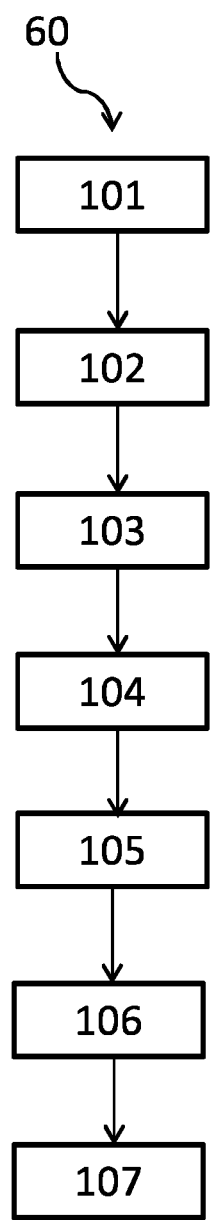
FIG. 6 shows a diagrammatic flow chart of a method for making a filtering panel according to an embodiment of the disclosure.

A filtering panel according to another aspect of the present invention may have a filter cloth made of AISI 316L stainless steel with a spacing ranging from 5 to 100 micron. In particular a filter cloth which can be used to be fixed to the frame 10 is shown, greatly enlarged, in FIGS. 4-6 and indicated by 16. This is of AISI 316L stainless steel, distinguished by the brand Betamesh®, and can have spacings of between 5 to 100 microns. A spacing corresponding to the pore-size of, for instance, 40 μm has a yield stress of typically about 140 N/cm or 14 N/mm in both warp and weft direction. From the FIGS. 4-6 it is seen that this cloth is composed of warp threads 17 embedded in weft threads 18 and 19. This kind of stainless filter cloth possesses good permeability. Obviously other types of stainless steel filter cloths or metals cloths may be used, provided that they have the appropriate filtering features. Depending on the pore size and woven filter threads used the maximum elastic limit or yield stress may vary in warp and weft directions.

Figure 8:
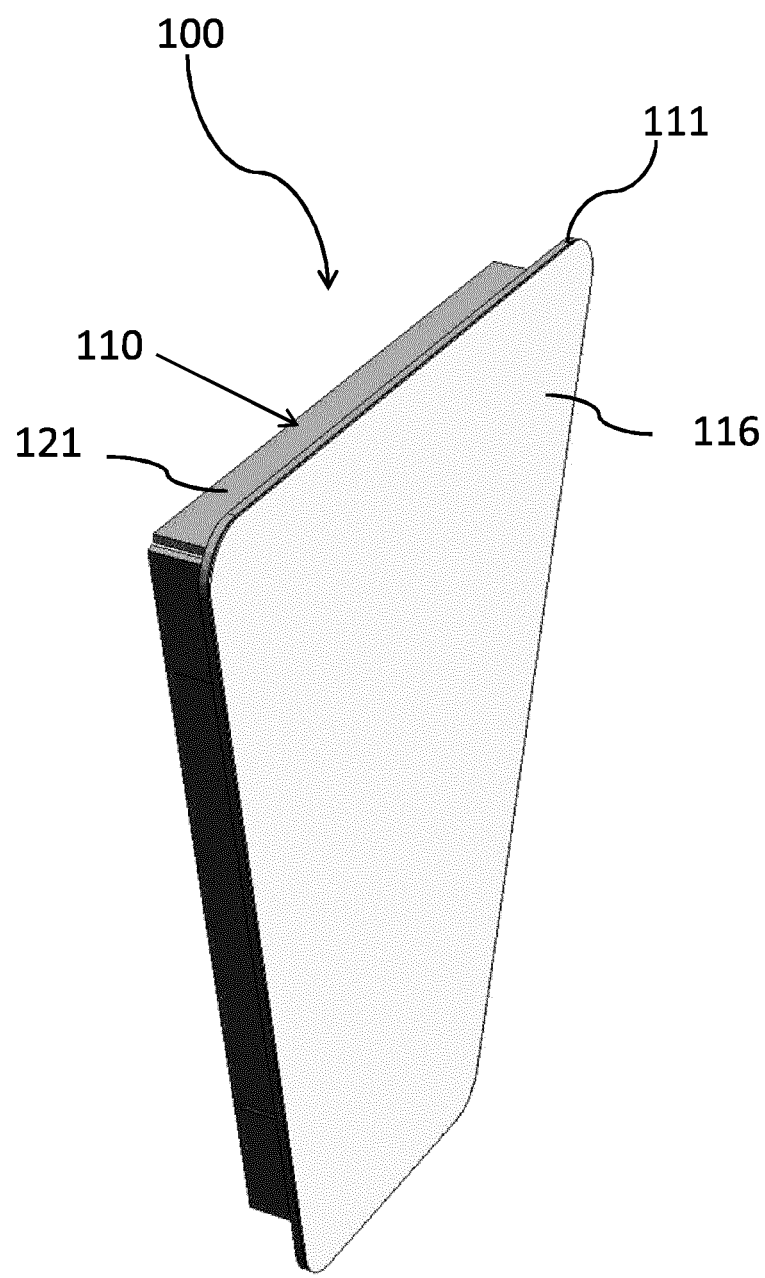
FIG. 8 is a schematic illustration of the filter frame of FIG. 7 with the metal cloth located on the peripheral portion of the filter frame.
Figure 9:
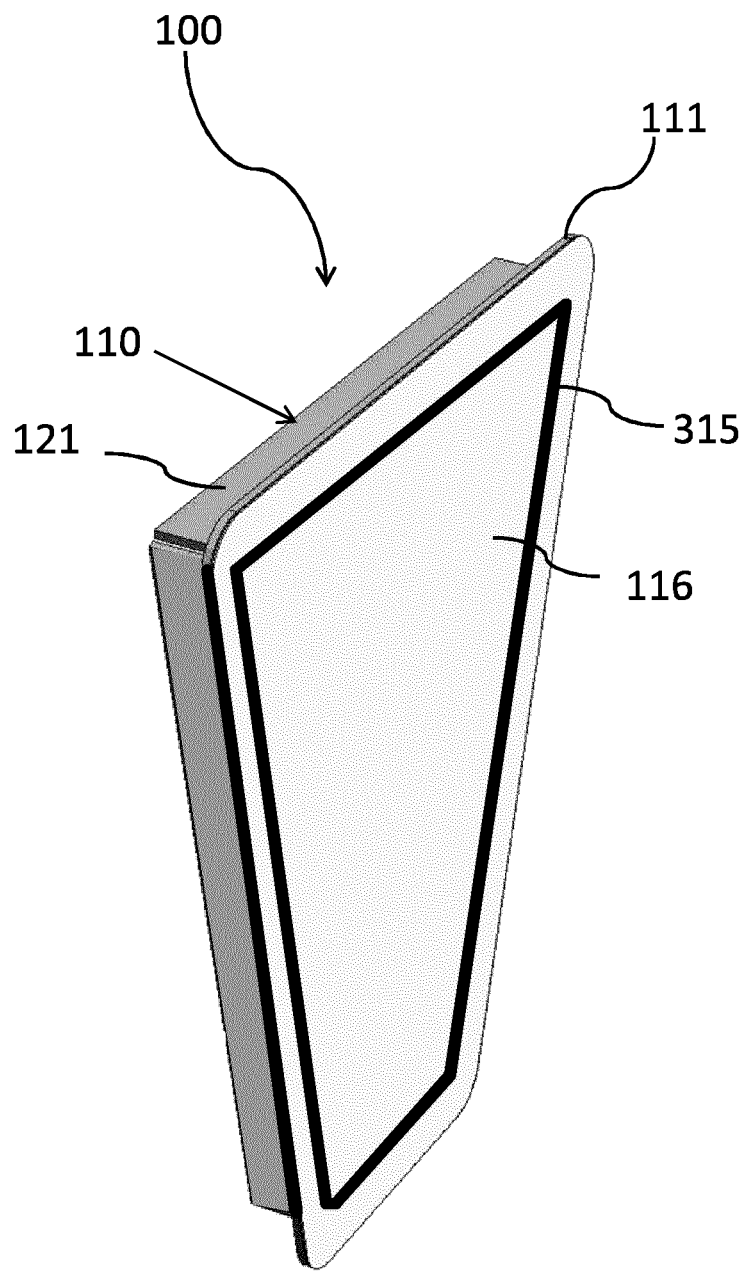
FIG. 9 shows a diagrammatic illustration of a finished filtering panel of FIGS. 7 and 8 respectively.

An example for a finished filtering panel obtained by fixing the above-mentioned metal or stainless steel cloth has been schematically represented in FIG. 9. The shown cloth 116 is embedded in the plastic material such as polypropylene of the peripheral portion 11. How this panel is made is described below in more detail and represented in the FIGS. 6 to 11.

The filtering panel according to the present invention combines the advantage of possessing good permeability features, conferred by the use of stainless steel filter cloths, at a cost decidedly less than that of the known filtering panels which already use this type of cloths but fixed to a frame of stainless steel. Furthermore it can be replaced without problems in the filter panels currently present in the existing disk filters, with a life span at least comparable to that of the known filtering panels.

Yet to another aspect, the present disclosure is directed to a method 60 for making a filtering panel with metal cloth, the method comprising:

injecting in the first method step 101 plastic material into a mold tool to integrally form a frame 110 with a peripheral portion 111 and a grillwork 112;

locating (method step 102) the cured frame 110 into a tensioning tool;

placing (method step 103) the steel cloth 116 on top of the frame 111;

fixing (method step 104) the peripheral edge region of the filter cloth 116 by the tensioning tool 300;

pre-tensioning (method step 105) the filter cloth 116 to at least 20% of the yield stress limit of the cloth 116;

applying pressure and heat (method step 106) on the pre-tensioned filter cloth 116 to fasten the filter cloth on a portion of the peripheral portion (111) by embedding the filter cloth in the plastic material.

For simplicity the method step of injecting material into a mold (step 101) has not been represented in a figure, since the manufacturing process of injection molding for producing thermoplastic plastic material parts such as the integrally formed filter frame 110 comprising a grillwork 112 is evident for an expert of the technical field.

Figure 12:
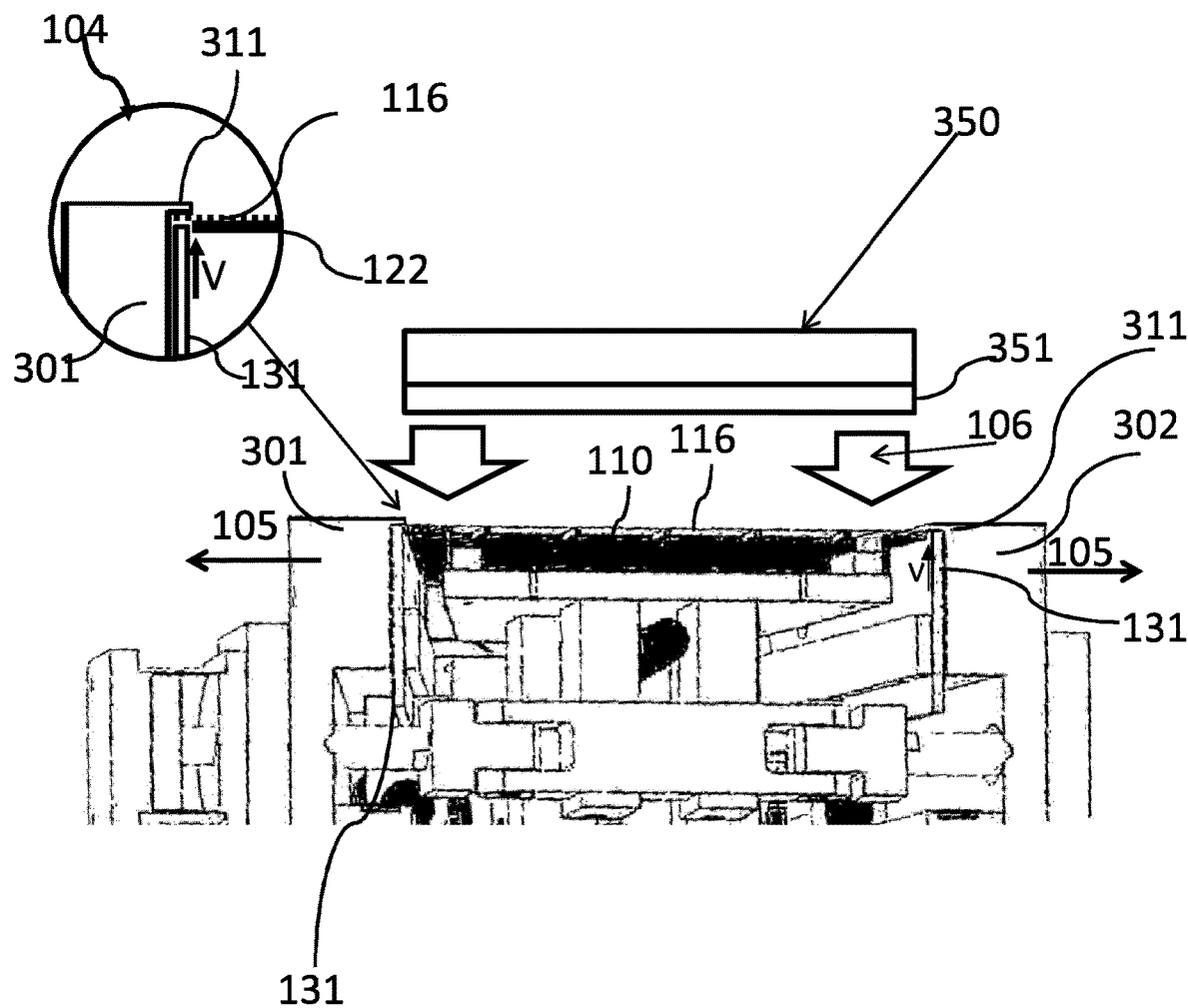
FIG. 12 shows diagrammatic illustrations of parts of the tensioning tool of FIG. 11 and a schematic compression device.

The heating temperature of a heated compression device 350, which performs the method step 106 and is shown in FIG. 12, is chosen such that the thermoplastic plastic material of the peripheral portion (111) softens at the region of the at least one bonding and embedding seam, wherein the temperature stays below the melting point of Teflon (PTFE).

Yet another aspect of the method according to the present invention comprises:

cooling (107) the heated plastic material, wherein the plastic material is selected from the group comprising polypropylene (PP), polyethylene (PE), polyphenylene oxide (PPO), a blend of PPO and styrene (Noryl), polyphenylene sulfide (PPS) and polyvinyl chloride (PVC).

The further method step 107 of cooling of the heated plastic material is performed for irreversibly fastening the filter cloth 116 to the respective portion or portions of the peripheral portion 111. A plurality of portions is needed for fastening if for instance two or more bonding seams 315 instead of one bonding seam are provided on the peripheral portion 111.

Figure 7:
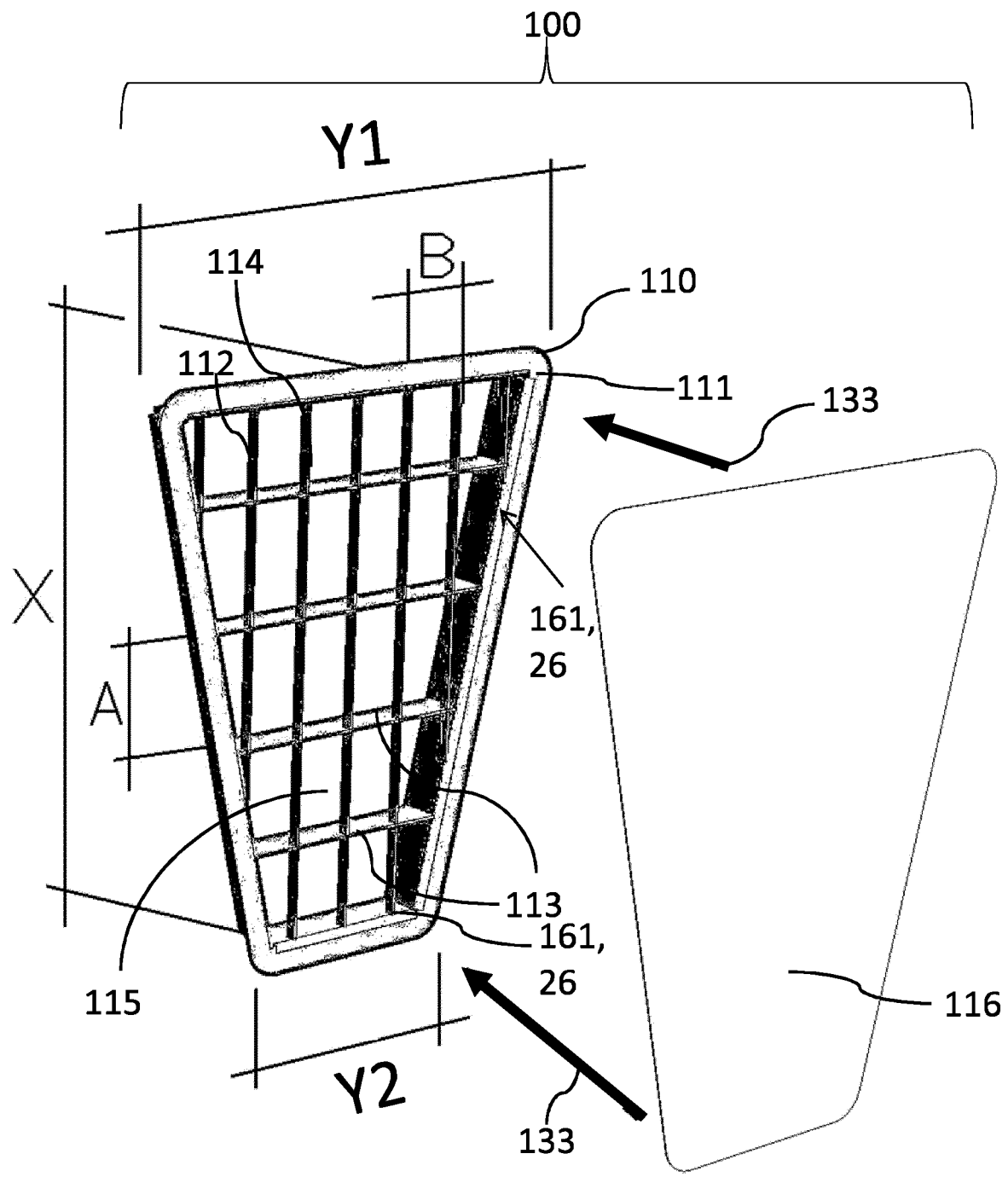
FIG. 7 is a schematic exploded view of a frame of a filtering panel according to another embodiment of the disclosure.

FIG. 7 shows schematically an exploded view of the filtering panel assembly 100 comprising the cured filter frame 110, as manufactured in method step 101, and a filter cloth 116 made of stainless steel, titanium or the like.

The view of FIG. 7 further indicates potential dimensions of the filter frame 110. As can be seen the peripheral portion 111 includes two substantially parallel sides Y1 and Y2 and two non-parallel sides. The dimensions shown in FIG. 7 are not to scale and may be for example as follows:

The smaller parallel sides of the trapezoid Y1 and Y2 measure 48 cm and 22 cm, respectively. The distance from the outer edges of each of said parallel sides Y1 and Y2 i.e. in the longitudinal direction of the strips 114 is about 57 cm. Moreover, in order to achieve the condition that each field does not exceed 5% of the inner area of the peripheral portion 111 the exemplary rectangular field area 115 has the side lengths of A=10 cm and B=6 cm.

The filtering panel according to the exemplary embodiment shown in FIG. 7 has a peripheral portion 111 of the frame 110, which has the same size as the peripheral portion of a panel with a frame of PP or the like and a polyester filter cloth, so that it can replace the latter in an existing disk filter. The trapezoidal form and respective dimensions are designed to conform with a filter support of a disk filter (not shown), wherein said filter support serves to support the bottom sides Y2 and the respective non-parallel sides of a pair of filter panels 110 in order to provide inside-out filtration. A plurality of filter supports are positioned to secure the filtering panels 110 on a drum to form a disk filter.

Alternatively to polypropylene other thermoplastic materials can be used, which are suited to manufacture components by injection molding and can be reformed or welded by applying heat. The materials of the frame 110 and integral grillwork 112 can further be selected from the group comprising polyethylene (PE), polyphenylene oxide (PPO), a blend of PPO and styrene (Noryl), polyphenylene sulfide (PPS) and polyvinyl chloride (PVC) or the like. Said plastic materials can be filled with fibers of glass or carbon for reinforcement.

Yet another aspect of the method according to the disclosure of the invention is directed to a disc filter (not shown) comprising a drum, which has a central longitudinal axis and which is rotatably arranged around the same and is adapted to receive a liquid which is to be filtered, and at least one diskshaped filter member, which on the outside of the drum extends outwards in the transverse direction of the drum and consists of releasably secured filtering panels 10, 100, characterized at least by the pre-tensioning of a stainless filter cloth 16, 116 by at least 20% as well as by a grillwork 112, wherein each field thereof does not exceed 10% of the inner area of the peripheral portion.

The embodiment shown in FIG. 7 comprises a non-continuous projecting ridge 161 along the inner edge region 26 of the peripheral portion 111. This ridge can be made continuous or non-continuous. The ridge can optionally be provided to support the bonding and embedding of the filter cloth 116 in the plastic material in the method step 106.

FIG. 7 shows schematically the method step 103, wherein the steel cloth 116 is placed on the top of the frame as indicated by the arrows 133.

FIG. 8 is a schematic illustration of the filter frame with the stainless filter cloth after the filter cloth is located on the filter frame 110 (see method step 103). Moreover, it can be seen that the dimensions of the stainless filter cloth corresponds to the outer circumference of the peripheral portion 111 of the filter frame 110. This outer circumference is cut after the metal filter cloth is irrecersibly fased by at least one bonding seam.

FIG. 9 shows the filtering panel 100 of FIG. 8 with the at least one bonding seam 315 i.e. after in the method step 106 pressure and heat has been applied. The at least one bonding seam 315 is continuous and located above the inner edge region 26 of the peripheral frame portion 111. In addition to the bonding seam 315 shown in FIG. 9 a further bonding seam may be provided at the outer edge (25) of the peripheral portion 111 (not shown). After cooling the plastic material (in method step 107) the at least one bonding seam 315 of the filter cloth 116 is fixedly or irreversibly attached to the inner edge region 26 of the peripheral portion 111.

Figure 10:
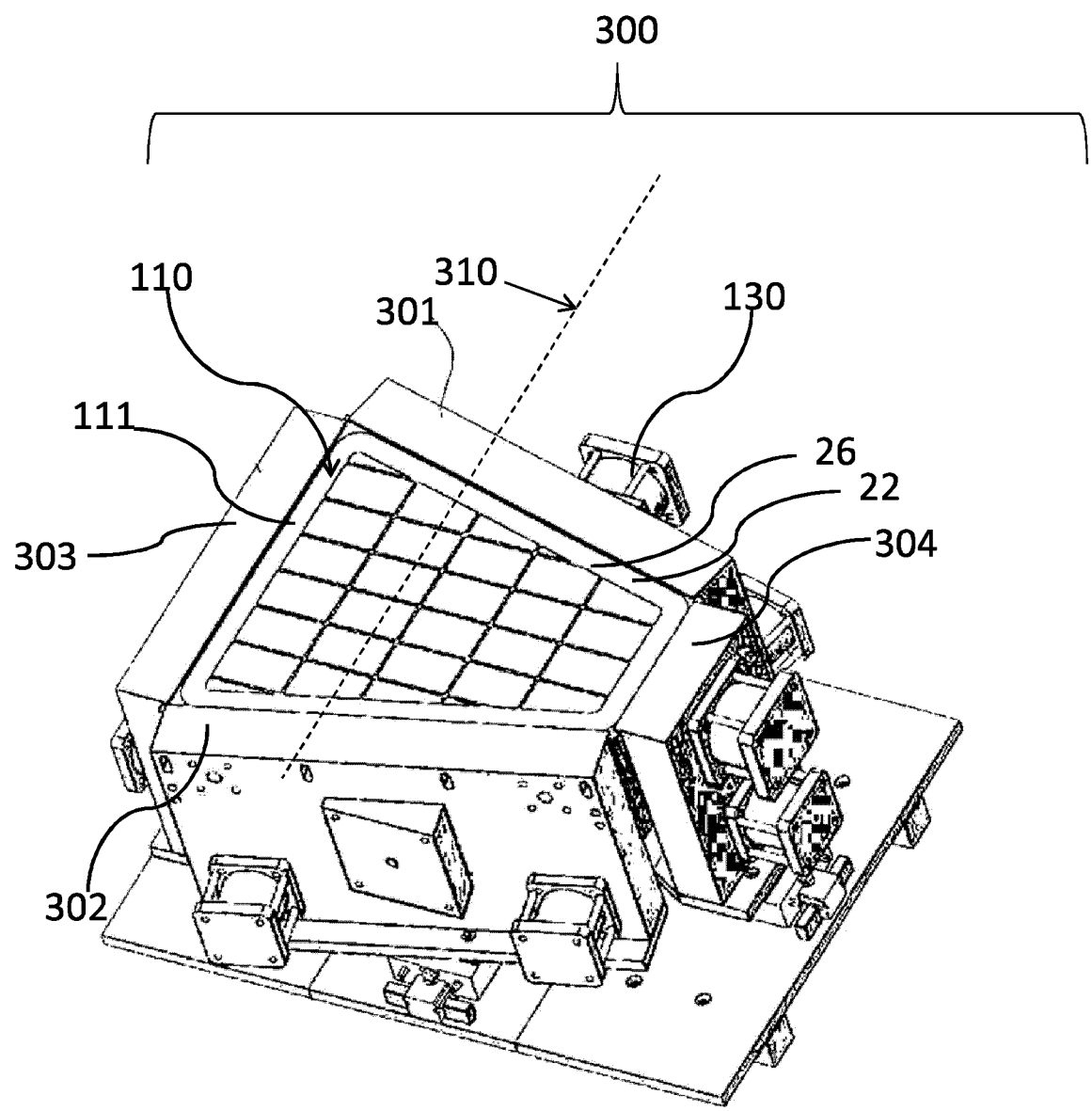
FIG. 10 shows a schematic illustration of a tensioning tool with a filter frame.

FIG. 10 shows a schematic illustration of the tensioning tool with a filter frame 110 positioned in the tensioning tool 300. In this illustration the filter frame 110 is surrounded by four movable elements 301, 302, 303 and 304 of the tensioning tool 300. As can be seen the filter frame 110 is located in the tensioning tool 300 such, that the second leg 22 of the peripheral portion 111 faces upwards.

Figure 11:
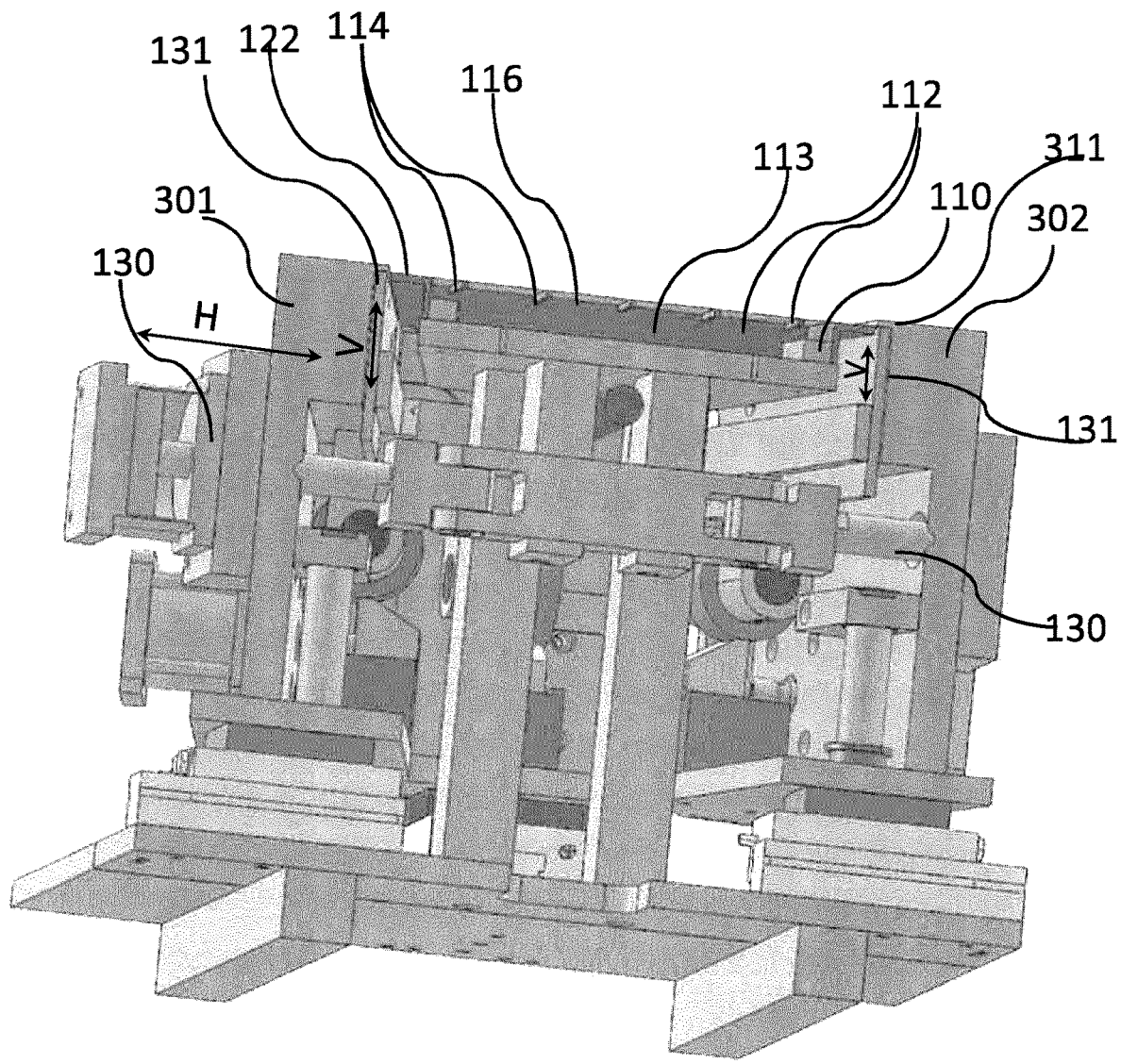
FIG. 11 shows the view of the tensioning tool according arrow 310 and a cross-section along the dashed line shown in FIG. 10.

FIG. 11 shows the cross-sectional view of the tensioning tool according to arrow 310 indicated in FIG. 10. In this illustration not only the filter frame 110 is located in the tensioning tool but also the filter cloth 116. The filter cloth has to be cut a few cm larger than the outer circumference of the peripheral portion 111 of the filter panel, in order to enable a fixation by the tensioning tool 300, more particularly by the elements 301, 302, 303 and 304, respectively. Cutting the filter cloth in this way avoids unnecessary waste of the expensive cloth material. How the fixation works in detail is explained below with regard to FIG. 12.

The cross-sectional views of FIG. 11 and FIG. 12 show that the outer edges of the filter frame 110 are arranged between the tensioning elements 301 and 302. Each of these elements 301 and 302 can be displaced horizontally (as indicated by the double arrow H) via the displacement means 130. The other opposing elements 303 and 304 are also coupled with respective displacement means to enable horizontal movements for pre-tensioning.

FIG. 12 shows diagrammatic illustrations of parts of the tensioning tool 300 and heated compression device 350 as well as an enlargement of the tensioning tool 300. The enlargement shown in the circle of FIG. 12 shows a fixation angle 311 of the elements 301 and 302 and at each element 301 and 302 a plate 131, which is vertically movable (as indicated by the arrows V) to fix the filter cloth 116 between the down facing side of the angle 311 and the plate 131. The configuration of the angles 311 and plates 131 at each element 301, 302, 303 and 304 allow to securely grip the filter cloth like a forceps.

After the opposing elements 301 and 302 and respective counter elements 131 of the tensioning tool 300 have fixed the filter cloth 116 by moving each plate 131 (see arrow 104) against the corresponding fixation angle 311 (see method step 104 as shown in the enlargement of FIG. 12), the filter cloth can further be pre-tensioned by moving the elements 301 and 302 in opposed direction as indicated by the arrows 105. Moving the elements 303 and 304 horizontally in an analogous way (not shown) the filter cloth 116 can be pre-tensioned in both the warp and weft directions.

This specifically designed tensioning tool 300 enables an admittedly difficult tensioning of a filter cloth, which was cut to about the outer circumference of the filter frame 110 with maximum a few cm overlap with respect to the outer circumference of the peripheral portion 111. The use of the tensioning tool 300 has the advantage that the amount of filter cloth 116 to be wasted can be reduced to its minimum, when manufacturing the filtering panel 100. Since woven metal cloths as stainless steel cloth 116 are known to be expensive to manufacture, the design of the tensioning tool 300 provides a solution to significantly reduce manufacturing costs, even if the filter cloth needs to be tensioned at least 20% of its yield stress.

FIG. 12 shows further a diagrammatic illustration of the method step 106 (see arrows), wherein the pre-tensioned filter cloth 116 and the below located plastic material is heated under pressure at least along the inner edge 26 of the peripheral portion 111 by the compression device 350. Applying simultaneously pressure and heat (downward directed arrows 106) results in fastening the filter cloth by bonding at least a portion of the peripheral portion panel 111. In order to avoid gluing of the heated plastic material to the face of the compression device 350, a teflon or polytetrafluoroethylene (PTFE) layer 351 or teflon strips in height of the peripheral portion 111 may be provided. In this way the at least bonding seam 315 as shown in FIG. 9 can be precisely produced. The heated compression device may be heated such that two or more bonding seams along the peripheral portion 111 are formed. Preferably two bonding seams at each edge (inner 26 and outer 25) are provided. By using the tensioning tool 300 in combination with the compression device 350 the manufacturing process and thus reproducibility can be improved.

The method for making filtering panels according to the present invention using metal cloths such as stainless steel cloth avoid complicated welding processes between steel components and result in a device with less problems of fatigue stress in the vicinity of the areas, where the cloth is attached to the frame. Further, based on the combination of a precise regulation of pre-tensioning and design of the robust grillwork within the inner area of the peripheral portion of the filter frame, the distortion effect by deflection occurring when hydraulic load is applied, can be significantly reduced.

Moreover, the modular design of the disc filter and its filtering panels 10, 110 offers flexibility for a broad range of flows. Applications may not only be municipial tertiary filtration but also the purification of industrial waste water, process water filtration or potable water filtration and others alike.

This written description uses examples to disclose the invention, including the best mode, and also to enable any person skilled in the art to practice the invention, including making and using any devices and performing any incorporated methods.

The patentable scope of the invention is defined by the claims, and may include other examples that occur to those skilled in the art. As used herein, the term "plurality" refers to two or more items or components.

The terms "comprising," "including," "having," and "consisting," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A filtering panel for a disk filter for water purification, the filtering panel comprising:
   a metal filter cloth; and
   a frame comprising a peripheral portion, the frame consisting of a plastic material loaded with fibers of glass or carbon, the frame being integral with an inner grillwork which divides an inner area of the frame into a plurality of fields, each field of the plurality of fields having an area not exceeding 10% of the inner area of the frame, the inner grillwork including longitudinal strips and transverse strips, the peripheral portion comprising a ridge on at least a portion of an inner edge region of the frame configured to support bonding of the metal filter cloth to the frame, and a portion of the metal filter cloth being embedded in a plastic material of the ridge along the inner edge region of the peripheral portion so as to be irreversibly fastened to the frame;
   wherein the metal filter cloth is pre-tensioned in both warp and weft directions to at least 20% of a yield stress of the metal filter cloth and fastened to the frame.

2. The filtering panel according to claim 1, wherein the metal filter cloth is pre-tensioned in both directions to a range of from 20% to 30% of the yield stress of the metal filter cloth.

3. The filtering panel according to one of claim 1 or claim 2, wherein the plastic material is selected from polypropylene (PP), polyethylene (PE), polyphenylene oxide (PPO), a blend of PPO and styrene, polyphenylene sulfide (PPS) and polyvinyl chloride (PVC) and mixtures thereof.

4. The filtering panel according to claim 3, wherein the plastic material is polypropylene and the plastic material is loaded with fiberglass in an amount from at least 20% to 40% weight percent.

5. The filtering panel according to claim 1 or claim 2, wherein each of the fields has an area not exceeding 5% of the inner area of the frame.

6. The filtering panel according to claim 1 or claim 2, wherein a peripheral portion of the frame comprises an L-shaped cross section having a flow parallel leg and a flow transverse leg substantially normal to the flow parallel leg.

7. The filtering panel according to claim 6, wherein the flow transverse leg comprises at least one of an inner edge portion for attaching the metal filter cloth to the frame and a circumferential outer edge portion for attaching the metal filter cloth to the frame.

8. The filtering panel according to claim 1 or claim 2, wherein the metal filter cloth comprises stainless steel and wherein the stainless steel of the metal filter cloth is AISI 316L.

9. The filtering panel according to claim 1 or claim 2, wherein the metal filter cloth has a pore size ranging from 5 to 100 micron.

10. The filtering panel according to claim 1, wherein the metal filter cloth is pre-tensioned in both warp and weft directions to at least 30% of a yield stress of the filter cloth and fastened to the frame.

11. The filtering panel according to claim 1, wherein a peripheral portion of the frame comprises a polytetrafluoroethylene (PTFE) layer.

12. The filtering panel according to claim 1, wherein the metal filter cloth is pre-tensioned in both warp and weft directions to a yield stress of between about 12 N/mm and about 17 N/mm.

13. The filtering panel according to claim 1, wherein the metal filter cloth comprises at least one bonding seam configured to be fixedly attached to the inner edge region of the peripheral portion of the frame.

14. The filtering panel according to claim 1, wherein a largest dimension of the plurality of fields is less than twice a smallest dimension of the plurality of fields.

15. The filtering panel according to claim 1, wherein the metal filter cloth comprises a metal selected from the group consisting of stainless steel, bronze, copper, brass, titanium, nickel and alloys thereof.

16. The filtering panel according to claim 1, wherein the transverse strips have a greater thickness parallel to a direction of water flow through the filtering panel than the longitudinal strips.

17. A disk filter comprising:
    a drum having a central longitudinal axis, rotatably arranged around the central longitudinal axis and adapted to receive a liquid to be filtered, and
    at least one disk-shaped filter member on an outside of the drum extending outwards in a transverse direction of the drum and including releasably secured filtering panels,
    wherein each of the filtering panels is a filtering panel as claimed in claim 1 or claim 2.

18. The disk filter according to claim 17, wherein the filtering panels are arranged to perform inside-out filtration of the liquid to be filtered.

19. The disk filter according to claim 17, wherein the liquid to be filtered comprises municipal wastewater.

20. The disk filter according to claim 17, wherein the liquid to be filtered comprises at least one of industrial wastewater, process water, and potable water.

* * * * *